(12) United States Patent
Bono et al.

(10) Patent No.: US 9,317,419 B1
(45) Date of Patent: Apr. 19, 2016

(54) SYSTEM AND METHOD FOR THIN PROVISIONING

(71) Applicant: EMC Corporation, Hopkinton, MA (US)

(72) Inventors: Jean-Pierre Bono, Westborough, MA (US); Morgan A. Clark, South Orange, NJ (US); Michael D. Scheer, Summit, NJ (US); William C. Davenport, Burlington, MA (US); Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 13/837,063

(22) Filed: Mar. 15, 2013

(51) Int. Cl.
*G06F 12/02* (2006.01)
*G06F 17/30* (2006.01)
*G06F 3/06* (2006.01)

(52) U.S. Cl.
CPC ............ *G06F 12/023* (2013.01); *G06F 3/0608* (2013.01); *G06F 3/0644* (2013.01); *G06F 3/0665* (2013.01); *G06F 3/0689* (2013.01); *G06F 17/30067* (2013.01)

(58) Field of Classification Search
CPC ... G06F 3/0665; G06F 3/0608; G06F 3/0644; G06F 3/0631; G06F 3/0604; G06F 17/30067; G06F 12/023
See application file for complete search history.

(56) References Cited

U.S. PATENT DOCUMENTS

| | | | | |
|---|---|---|---|---|
| 7,802,063 | B1* | 9/2010 | Chatterjee et al. | 711/156 |
| 8,352,697 | B2* | 1/2013 | Lasser | 711/170 |
| 2013/0212593 | A1* | 8/2013 | Baset et al. | 718/104 |
| 2013/0326186 | A1* | 12/2013 | Shaikh et al. | 711/170 |

OTHER PUBLICATIONS

Mukherjee, Anirban; Kaliannan, Kirubakaran, "Thin Provisioning and Storage Reclamation" Storage Developer Conference, 2009.*
Symantec, "Start Thin, Get Thin, and Stay Thin with Thin Provisioning Technology from Symantec and 3PAR". Feb. 2009.*

* cited by examiner

*Primary Examiner* — Matthew Bradley
*Assistant Examiner* — Rocio Del Mar Perez-Velez
(74) *Attorney, Agent, or Firm* — Brian J. Colandreo; Mark H. Whittenberger; Holland & Knight LLP (57) ABSTRACT

A method, computer program product, and computing system for grouping storage blocks within a file system into a plurality of storage pools including a free-backed storage pool, a free-unbacked storage pool, and an allocated-backed storage pool. The free-backed storage pool identifies unused storage blocks within the file system that are already associated with physical storage space within a backend storage system. The free-unbacked storage pool identifies unused storage blocks within the file system that are not yet associated with physical storage space within the backend storage system. The allocated-backed storage pool identifies used storage blocks within the file system that are already associated with physical storage space within the backend storage system. A request is received for one or more unused storage blocks within the file system. The request is fulfilled by selecting one or more unused storage blocks identified within the storage pools while prioritizing the selection of unused storage blocks identified within the free-backed storage pool.

21 Claims, 4 Drawing Sheets

SYSTEM AND METHOD FOR THIN PROVISIONING

TECHNICAL FIELD

This disclosure relates to storage systems and, more particularly, to thinly-provisioned storage systems.

BACKGROUND

Storing and safeguarding electronic content is of paramount importance in modern business. Accordingly, various systems may be employed to protect such electronic content.

Accordingly, data may be stored within centralized data storage systems, which may be configured to provide a high level of availability, wherein each user of such a storage system may be granted a defined quantity of storage. Oftentimes, users of such system rarely utilize the quantity of storage assigned to them. Therefore, portions of such a storage system may be defined as being for the exclusive use of a particular user, wherein that user never actually makes use of a large portion of the storage space assigned to them. Therefore, such storage systems may be configured to be thinly-provisioned, wherein a maximum quantity of storage space is defined for use by a user. However, physical storage space is only assigned to the user based upon actual use. Accordingly, storage space is reactively granted to the user (in response to actual use), as opposed to proactively blocked off for the user based upon the anticipated use of the user.

SUMMARY OF DISCLOSURE

In one implementation, a computer-implemented method of organizing storage includes grouping storage blocks within a file system into a plurality of storage pools including a free-backed storage pool, a free-unbacked storage pool, and an allocated-backed storage pool. The free-backed storage pool identifies unused storage blocks within the file system that are already associated with physical storage space within a backend storage system. The free-unbacked storage pool identifies unused storage blocks within the file system that are not yet associated with physical storage space within the backend storage system. The allocated-backed storage pool identifies used storage blocks within the file system that are already associated with physical storage space within the backend storage system. A request is received for one or more unused storage blocks within the file system. The request is fulfilled by selecting one or more unused storage blocks identified within the storage pools while prioritizing the selection of unused storage blocks identified within the free-backed storage pool.

One or more of the following features may be included. Prioritizing the selection of unused storage blocks identified within the free-backed storage pool may include selecting all unused storage blocks identified within the free-backed storage pool prior to selecting any unused storage blocks identified within the free-unbacked storage pool. Prioritizing the selection of unused storage blocks identified within the free-backed storage pool may include weighting unused storage blocks based, at least in part, upon the level of sequentiality of the physical storage space within the backend storage system, wherein physical storage spaces that enhance sequentiality are prioritized over physical storage spaces that do not enhance sequentiality.

Data may be written to the selected one or more unused storage blocks identified within the storage pools. The backend storage system may be a thinly-provisioned backend storage system. The physical storage space within the backend storage system may include at least a portion of a storage slice. The backend storage system may include a data array.

In another implementation, a computer program product resides on a computer readable medium that has a plurality of instructions stored on it. When executed by a processor, the instructions cause the processor to perform operations including grouping storage blocks within a file system into a plurality of storage pools including a free-backed storage pool, a free-unbacked storage pool, and an allocated-backed storage pool. The free-backed storage pool identifies unused storage blocks within the file system that are already associated with physical storage space within a backend storage system. The free-unbacked storage pool identifies unused storage blocks within the file system that are not yet associated with physical storage space within the backend storage system. The allocated-backed storage pool identifies used storage blocks within the file system that are already associated with physical storage space within the backend storage system. A request is received for one or more unused storage blocks within the file system. The request is fulfilled by selecting one or more unused storage blocks identified within the storage pools while prioritizing the selection of unused storage blocks identified within the free-backed storage pool.

One or more of the following features may be included. Prioritizing the selection of unused storage blocks identified within the free-backed storage pool may include selecting all unused storage blocks identified within the free-backed storage pool prior to selecting any unused storage blocks identified within the free-unbacked storage pool. Prioritizing the selection of unused storage blocks identified within the free-backed storage pool may include weighting unused storage blocks based, at least in part, upon the level of sequentiality of the physical storage space within the backend storage system, wherein physical storage spaces that enhance sequentiality are prioritized over physical storage spaces that do not enhance sequentiality.

Data may be written to the selected one or more unused storage blocks identified within the storage pools. The backend storage system may be a thinly-provisioned backend storage system. The physical storage space within the backend storage system may include at least a portion of a storage slice. The backend storage system may include a data array.

In another implementation, a computing system includes at least one processor and at least one memory architecture coupled with the at least one processor, wherein the computing system is configured to perform operations including grouping storage blocks within a file system into a plurality of storage pools including a free-backed storage pool, a free-unbacked storage pool, and an allocated-backed storage pool. The free-backed storage pool identifies unused storage blocks within the file system that are already associated with physical storage space within a backend storage system. The free-unbacked storage pool identifies unused storage blocks within the file system that are not yet associated with physical storage space within the backend storage system. The allocated-backed storage pool identifies used storage blocks within the file system that are already associated with physical storage space within the backend storage system. A request is received for one or more unused storage blocks within the file system. The request is fulfilled by selecting one or more unused storage blocks identified within the storage pools while prioritizing the selection of unused storage blocks identified within the free-backed storage pool.

One or more of the following features may be included. Prioritizing the selection of unused storage blocks identified within the free-backed storage pool may include selecting all unused storage blocks identified within the free-backed storage pool prior to selecting any unused storage blocks identified within the free-unbacked storage pool. Prioritizing the selection of unused storage blocks identified within the free-backed storage pool may include weighting unused storage blocks based, at least in part, upon the level of sequentiality of the physical storage space within the backend storage system, wherein physical storage spaces that enhance sequentiality are prioritized over physical storage spaces that do not enhance sequentiality.

Data may be written to the selected one or more unused storage blocks identified within the storage pools. The backend storage system may be a thinly-provisioned backend storage system. The physical storage space within the backend storage system may include at least a portion of a storage slice. The backend storage system may include a data array.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
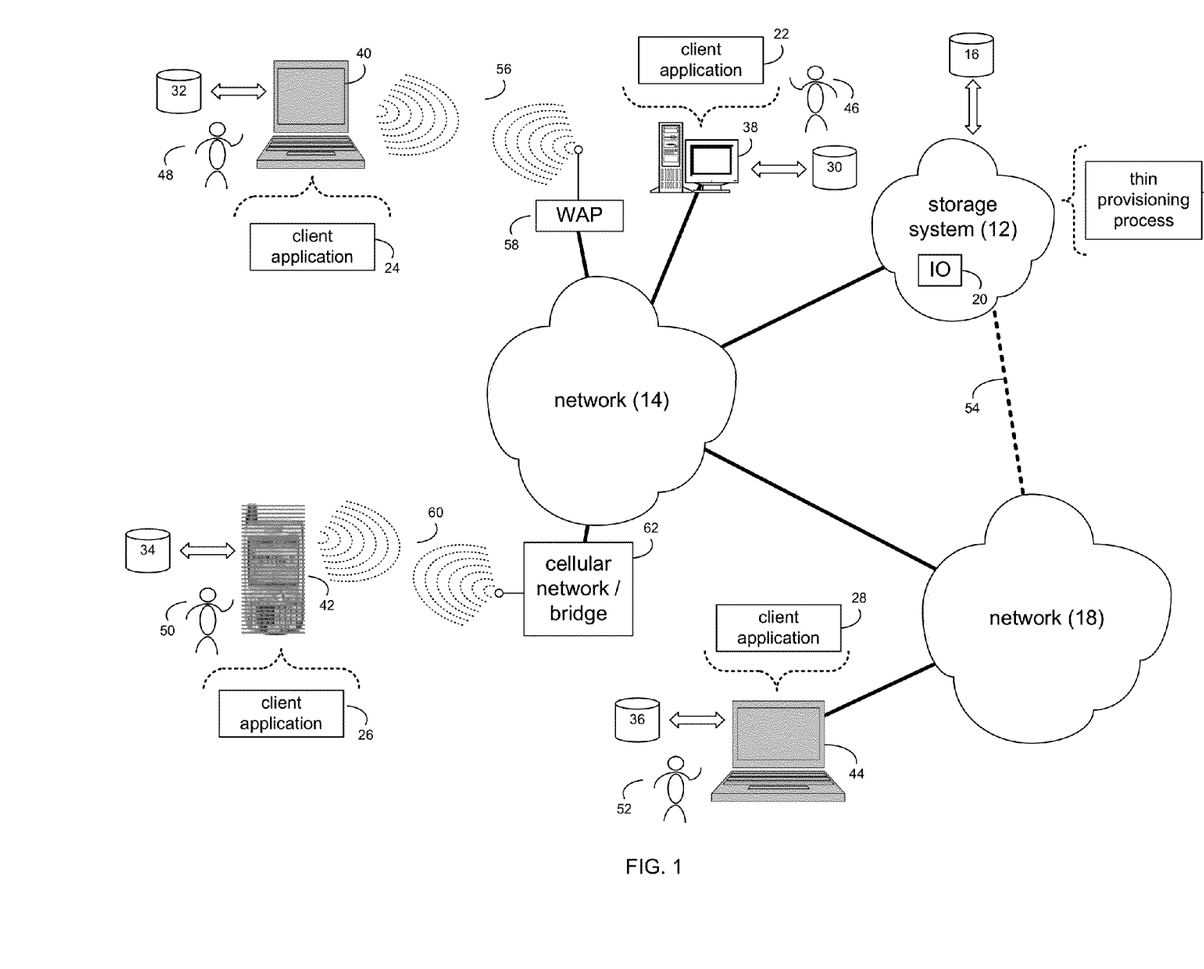
FIG. 1 is a diagrammatic view of a storage system and a thin provisioning process coupled to a distributed computing network.

Referring to FIG. 1, there is shown thin provisioning process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of thin provisioning process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be processed by storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
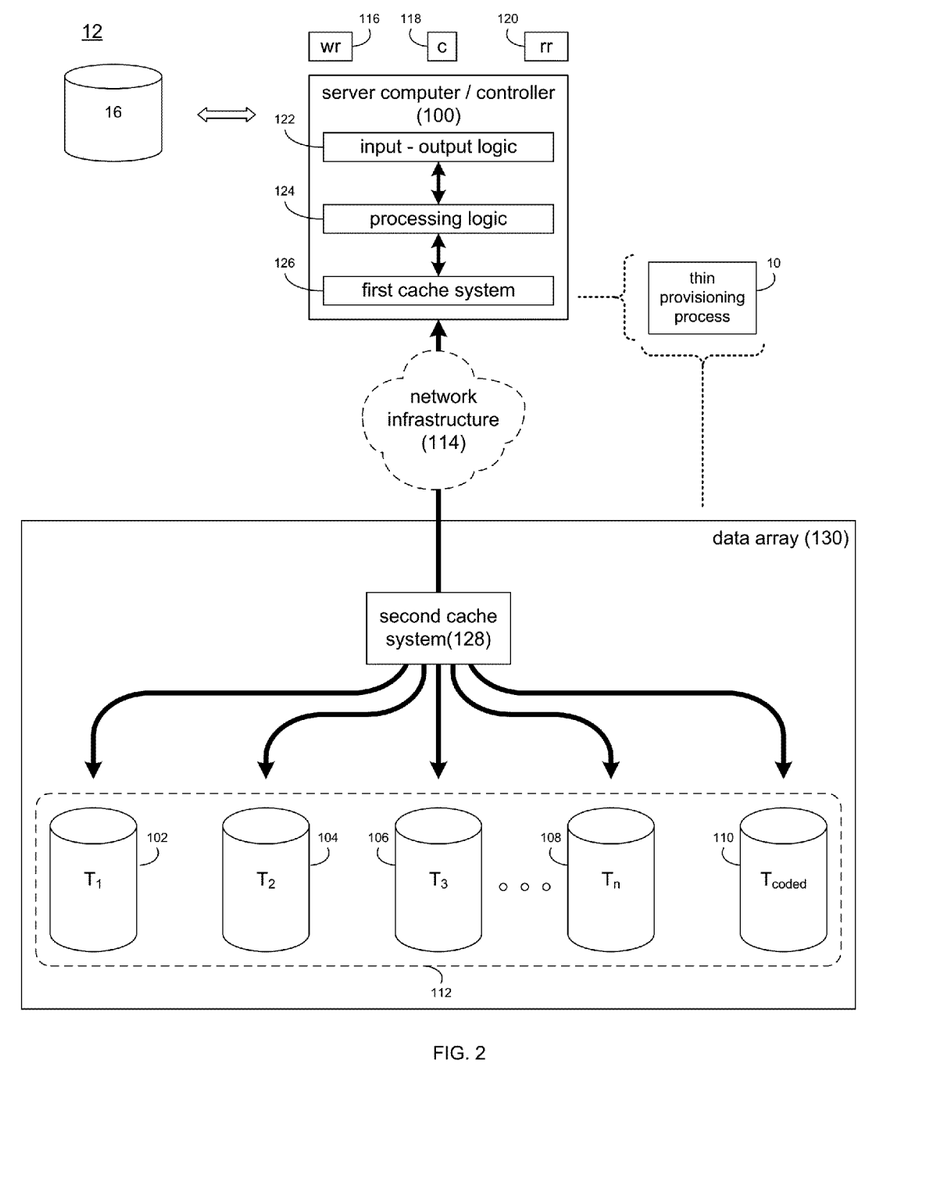
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of thin provisioning process 10. The instruction sets and subroutines of thin provisioning process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be processed by storage system 12. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100.

Depending upon the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of thin provisioning process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of thin provisioning process 10 may be executed by one or more processors (not shown) and one or more memory architectures (not shown) included within data array 130.

Thin Provisioning Process:

When a storage space is provisioned in a traditional fashion, the quantity of storage assigned to a user is typically partitioned and blocked-out for the exclusive use of the user. Therefore, if a user is assigned 16.0 gigabytes of storage space, a 16.0 gigabyte "chunk" of physical storage space may be reserved for the exclusive use of the user. Accordingly, in the event that the user does not use the physical storage space, the physical storage space remains unused and unavailable for use by other users.

However, when a storage space is thinly-provisioned, the storage space may be configured quite differently. For example, when the same 16.0 gigabytes of storage space is thinly-provisioned, an upper capacity limit (e.g., 16.0 gigabytes) may be defined for the thinly-provisioned, storage space. However, no physical storage space may be proactively partitioned or blocked out for the exclusive use of the user. Therefore, until the user actually uses the storage space, the storage space is available for use by other users.

Figure 3:
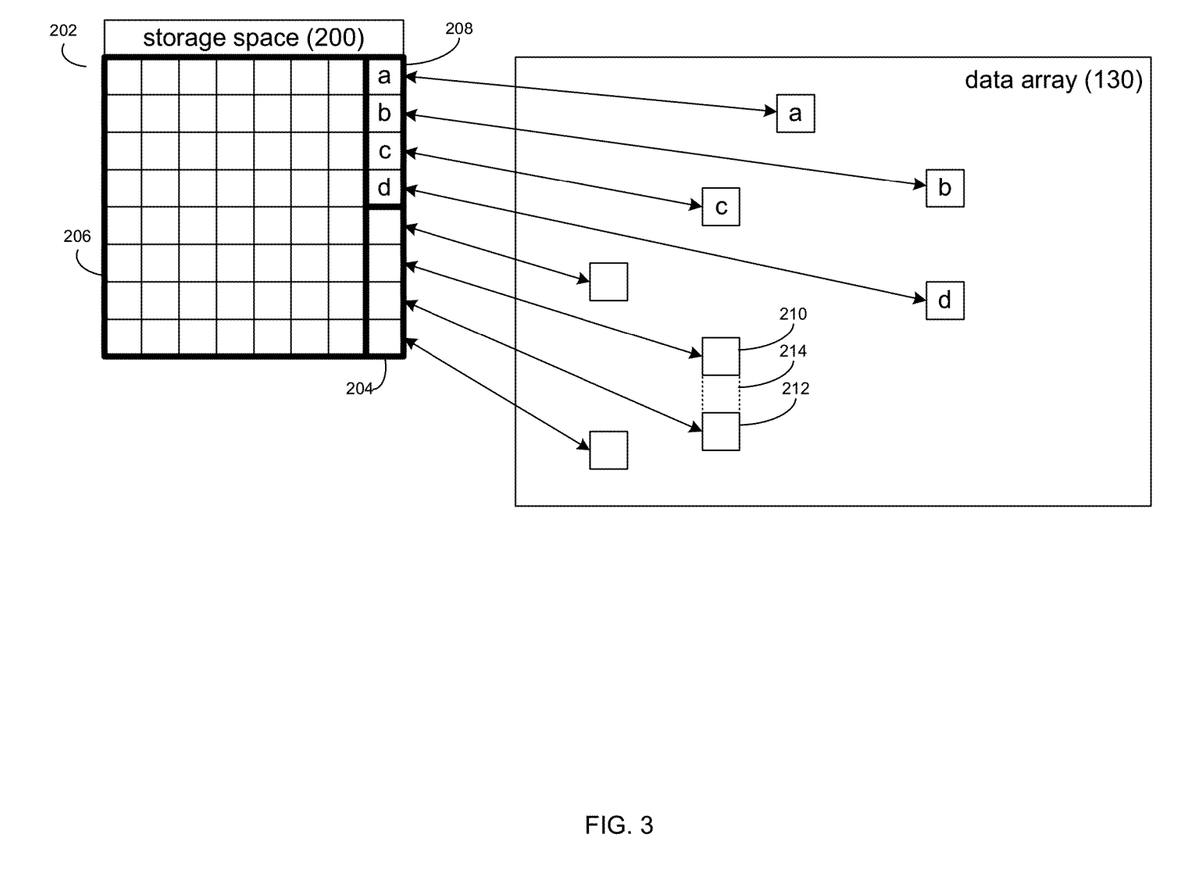
FIG. 3 is a diagrammatic view of a storage space defined within the storage system of FIG. 1.

Referring also to FIG. 3, assume for illustrative purposes that an administrator (not shown) of storage system 12 assigns to user 46 (using thin provisioning process 10) a thinly-provisioned 16.0 gigabyte storage space (e.g., storage space 200) within storage system 12. Therefore, upon the initial assignment of storage space 200, the quantity of physical storage space utilized within storage system 12 is zero.

Assume for illustrative purposes that storage space 200 is divided into a quantity of storage blocks (e.g., storage blocks 202) that are identifiable and accessible within a file system that is utilized to access storage space 200. While storage space 200 is shown to be divided into sixty-four storage blocks, this is for illustrative purposes only and is not intended to be a limitation of this disclosure, as other configurations are possible. For example, storage space 200 may be divided into a larger quantity of 8.0 kilobyte storage blocks (not shown).

While the above-described sixty-four storage blocks (e.g., storage blocks 202) are used by the file system to define the 16.0 gigabytes of storage space 200, as storage space 200 is thinly-provisioned, these sixty-four storage blocks may not be initially associated with any physical storage space included within data array 130 (and may not be until data is actually stored within a storage block). Accordingly, each of storage blocks 202 may function as a virtual storage container that is visible within the file system but is not associated with any physical storage space until it is actually used to store data, at which point the storage block may be associated with physical storage space within data array 130. An example of such a physical storage space may include but is not limited to all or a portion of a storage slice (e.g., a 1.0 megabyte storage slice).

Figure 4:
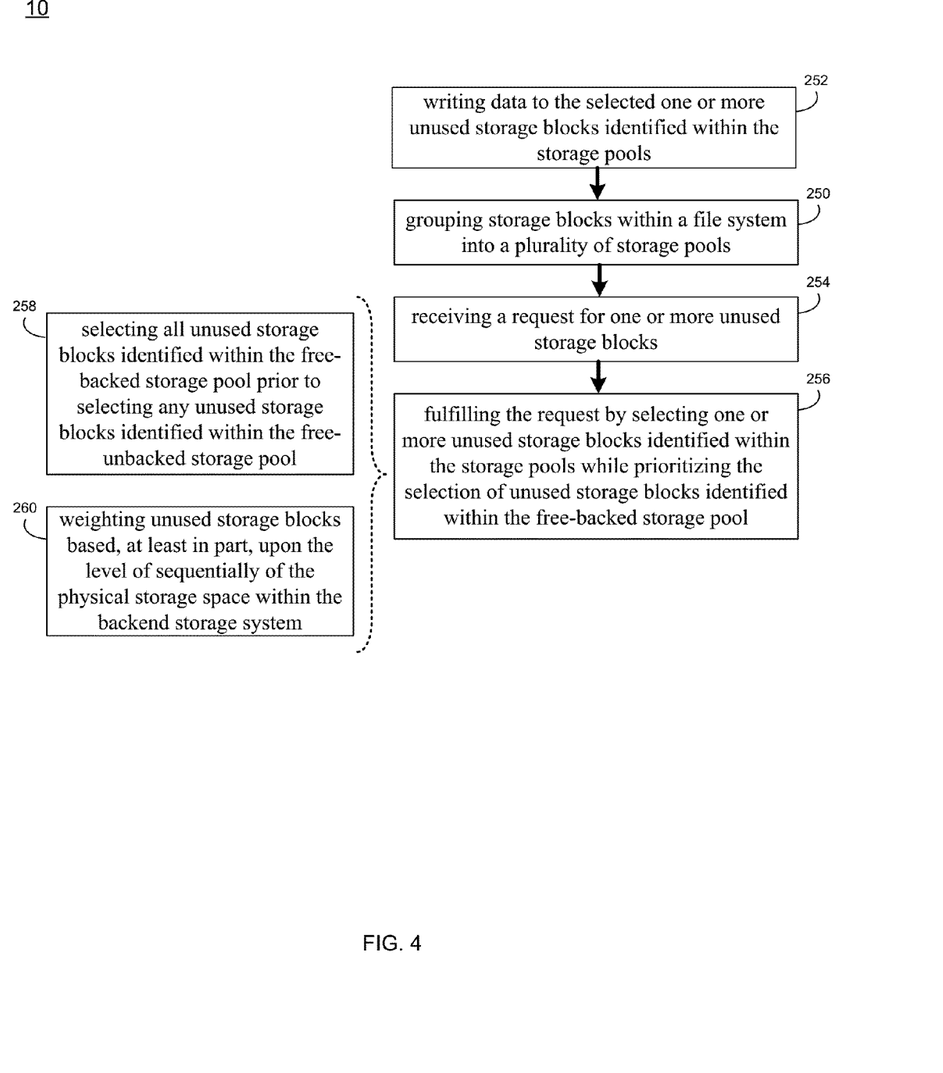
FIG. 4 is a flow chart of the thin provisioning process of FIG. 1.

Referring also to FIG. 4, thin provisioning process 10 may group 250 each of storage blocks 202 included within storage space 200 into a plurality of storage pools, examples of which may include but are not limited to free-backed storage pool 204, free-unbacked storage pool 206, and allocated-backed storage pool 208. Free-backed storage pool 204 may identify unused storage blocks within the file system that are already associated with physical storage space within a backend storage system (e.g., data array 130). Free-unbacked storage pool 206 may identify unused storage blocks within the file system that are not yet associated with physical storage space within the backend storage system (e.g., data array 130). And allocated-backed storage pool 208 may identify used storage blocks within the file system that are already associated with physical storage space within the backend storage system (e.g., data array 130).

When a storage space (e.g., storage space 200) is initially defined by thin provisioning process 10 and the storage blocks (e.g., storage blocks 202) that define the storage space are initially identified, all of the storage blocks may be placed into free-unbacked storage pool 206, as each of these storage blocks is currently "free" (i.e., not used) in that no data has been written to it yet and, therefore, is "unbacked" (i.e., not associated with physical storage space), as storage space 200 is thinly-provisioned and, therefore, the storage blocks included therein are only associated with physical storage space within data array 130 upon data being written to a storage block.

As user 46 writes data to storage space 200, thin provisioning process 10 may identify one or more storage blocks from free-unbacked storage pool 206 and write 252 data to these storage blocks, resulting in these storage blocks being moved to allocated-backed storage pool 208, as each of these storage blocks is now "allocated" (i.e., being used) in that data has been written to it and, therefore, is "backed" (i.e., associated with physical storage space), as the physical storage space is used to store the data. For example, assume that user 46 wishes to write data (e.g., data a, b, c, d) to storage space 200. Accordingly, thin provisioning process 10 may select four storage blocks (e.g., one for each of data a, b, c, d) from free-unbacked storage pool 206; associate each of these selected storage blocks with a physical storage space within data array 130; and write the data (e.g., data a, b, c, d) to these storage blocks (and the associated physical storage space within data array 130).

Additionally, when data is no longer needed (e.g., user 46 wishes to delete data from storage space 200), thin provisioning process 10 may delete (or allow for the overwriting of) the data stored in the appropriate storage blocks included within allocated-backed storage pool 208, resulting in these storage blocks being moved to free-backed storage pool 204, as each of these storage blocks is now "free" (i.e., no longer being used) and new data may be written to it. Further, each of these storage blocks is still "backed" (i.e., associated with physical storage space), as the physical storage space that was previously used to store the deleted data is still associated with the storage block. For example, assume that user 46 wishes to delete data (e.g., data a, b, c, d) from storage space 200. Accordingly, thin provisioning process 10 may select the appropriate storage blocks (i.e., the storage blocks currently storing data a, b, c, d) from allocated-backed storage pool 208 and delete (or allow for the overwriting of) the data (e.g., data a, b, c, d) stored within these storage blocks (and the associated physical storage space).

When selecting storage blocks (chosen from storage blocks 202) to which data is to be written, thin provisioning process 10 may prioritize the selection of unused storage blocks identified within free-backed storage pool 204, as these storage blocks are already associated with a physical storage space within data array 130. Accordingly, the consumption of additional physical storage space is avoided, as is the computational expense of associating new physical storage space with a storage block.

For example, assume that thin provisioning process 10 receives 254 a request (e.g., write request 116) for one or more unused storage blocks within the above-described file system. As discussed above, assume that write request 116 is a request that content 118 be written to storage system 12. Thin provisioning process 10 may fulfill 256 write request 116 by selecting one or more unused storage blocks identified within the storage pools (e.g., free-backed storage pool 204 and/or free-unbacked storage pool 206), while prioritizing the selection of unused storage blocks identified within free-backed storage pool 204 (for the reasons discussed above).

When prioritizing the selection of unused storage blocks identified within free-backed storage pool 204, thin provisioning process 10 may select 258 all unused storage blocks identified within free-backed storage pool 204 prior to selecting any unused storage blocks identified within free-unbacked storage pool 206. For example and as shown in FIG. 3, free-backed storage pool 204 is shown to include four storage blocks. Accordingly, in the event that the data to be written to storage device 12 fits in four or less storage blocks, thin provisioning process 10 may utilize the four storage blocks included within free-backed storage pool 204 prior to utilizing any storage blocks included within free-unbacked storage pool 206.

However, other factors may be considered when prioritizing the selection of unused storage blocks identified within free-backed storage pool 204. For example, thin provisioning process 10 may weight 260 the unused storage blocks based, at least in part, upon the level of sequentiality of the physical storage space within the backend storage system (e.g., data array 130), wherein physical storage spaces that enhance sequentiality may be prioritized over physical storage spaces that do not enhance sequentiality.

For example and as discussed above, free-backed storage pool 204 is shown to include four storage blocks. Accordingly, in the event that the data to be written to storage device 12 requires three storage blocks, it may seem logical that thin provisioning process 10 may utilize three of the four storage blocks included within free-backed storage pool 204 to fulfill 256 write request 116. However, assume that physical storage spaces 210, 212 (which are associated with two storage blocks defined within free-backed storage pool 204) are separated by one physical storage space (e.g., physical storage space 214), which is not currently associated with a storage block defined within free-backed storage pool 204. As utilizing physical storage spaces 210, 212, 214 would result in the use of three sequential physical storage spaces (thus enhancing efficiency and reducing data fragmentation), thin provisioning process 10 may utilize two storage blocks defined within free-backed storage pool 204 (e.g., the two associated with physical storage spaces 210, 212) and one storage block included within free-unbacked storage pool 206, which thin provisioning process 10 may associate within physical storage space 214, thus allowing the use of three sequential physical storage spaces.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/ special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method of organizing storage comprising:
    grouping storage blocks within a file system into a plurality of storage pools including a free-backed storage pool, a free-unbacked storage pool, and an allocated-backed storage pool, wherein:
        the free-backed storage pool identifies unused storage blocks within the file system that are already associated with physical storage space within a backend storage system,
        the free-unbacked storage pool identifies unused storage blocks within the file system that are not yet associated with physical storage space within the backend storage system, and
        the allocated-backed storage pool identifies used storage blocks within the file system that are already associated with physical storage space within the backend storage system;
    receiving a request for one or more unused storage blocks within the file system; and
    fulfilling the request by selecting one or more unused storage blocks identified within the storage pools while prioritizing the selection of physically sequential unused storage blocks identified within the backend storage system, wherein the selection of the unused storage blocks within the backend storage system is based, at least in part, upon a weighting, wherein the weighting identified with unused storage blocks that enhance a level of sequentiality is higher than the weighting identified with unused storage blocks that are not yet associated with physical storage space within the backend storage system, wherein the selection of unused storage blocks identified with higher weightings is prioritized over unused storage blocks identified with lower weightings.

2. The computer-implemented method of claim 1 wherein prioritizing the selection of unused storage blocks identified within the backend storage system includes:
    selecting all unused physically sequential storage blocks identified within the free-backed storage pool prior to selecting any unused storage blocks identified within the free-unbacked storage pool.

3. The computer-implemented method of claim 1 wherein prioritizing the selection of unused storage blocks identified within the backend storage system includes:
    weighting unused storage blocks based, at least in part, upon the level of sequentiality of the physical storage space within the backend storage system, wherein physical storage spaces that enhance sequentiality are prioritized over physical storage spaces that do not enhance sequentiality.

4. The computer-implemented method of claim 1 further comprising:
    writing data to the selected one or more unused storage blocks identified within the storage pools.

5. The computer-implemented method of claim 1 wherein the backend storage system is a thinly-provisioned backend storage system.

6. The computer-implemented method of claim 1 wherein the physical storage space within the backend storage system includes at least a portion of a storage slice.

7. The computer-implemented method of claim 1 wherein the backend storage system includes a data array.

8. A computer program product residing on a non-transitory computer readable medium having a plurality of instructions stored thereon which, when executed by a processor, cause the processor to perform operations comprising:

grouping storage blocks within a file system into a plurality of storage pools including a free-backed storage pool, a free-unbacked storage pool, and an allocated-backed storage pool, wherein:

the free-backed storage pool identifies unused storage blocks within the file system that are already associated with physical storage space within a backend storage system, the free-unbacked storage pool identifies unused storage blocks within the file system that are not yet associated with physical storage space within the backend storage system, and the allocated-backed storage pool identifies used storage blocks within the file system that are already associated with physical storage space within the backend storage system;

receiving a request for one or more unused storage blocks within the file system; and fulfilling the request by selecting one or more unused storage blocks identified within the storage pools while prioritizing the selection of physically sequential unused storage blocks identified within the backend storage system, wherein the selection of the unused storage blocks within the backend storage system is based, at least in part, upon a weighting, wherein the weighting identified with unused storage blocks that enhance a level of sequentiality is higher than the weighting identified with unused storage blocks that are not yet associated with physical storage space within the backend storage system, wherein the selection of unused storage blocks identified with higher weightings is prioritized over unused storage blocks identified with lower weightings.

9. The computer program product of claim 8 wherein prioritizing the selection of unused storage blocks identified within the backend storage system includes:

selecting all unused physically sequential storage blocks identified within the free-backed storage pool prior to selecting any unused storage blocks identified within the free-unbacked storage pool.

10. The computer program product of claim 8 wherein prioritizing the selection of unused storage blocks identified within the free-backed storage pool includes:

weighting unused storage blocks based, at least in part, upon the level of sequentiality of the physical storage space within the backend storage system, wherein physical storage spaces that enhance sequentiality are prioritized over physical storage spaces that do not enhance sequentiality.

11. The computer program product of claim 8 further comprising instructions for:

writing data to the selected one or more unused storage blocks identified within the storage pools.

12. The computer program product of claim 8 wherein the backend storage system is a thinly-provisioned backend storage system.

13. The computer program product of claim 8 wherein the physical storage space within the backend storage system includes at least a portion of a storage slice.

14. The computer program product of claim 8 wherein the backend storage system includes a data array.

15. A computing system including at least one processor and at least one memory architecture coupled with the at least one processor, wherein the computing system is configured to perform operations comprising:

grouping storage blocks within a file system into a plurality of storage pools including a free-backed storage pool, a free-unbacked storage pool, and an allocated-backed storage pool, wherein:

the free-backed storage pool identifies unused storage blocks within the file system that are already associated with physical storage space within a backend storage system, the free-unbacked storage pool identifies unused storage blocks within the file system that are not yet associated with physical storage space within the backend storage system, and the allocated-backed storage pool identifies used storage blocks within the file system that are already associated with physical storage space within the backend storage system;

receiving a request for one or more unused storage blocks within the file system; and fulfilling the request by selecting one or more unused storage blocks identified within the storage pools while prioritizing the selection of physically sequential unused storage blocks identified within the backend storage system, wherein the selection of the unused storage blocks within the backend storage system is based, at least in part, upon a weighting, wherein the weighting identified with unused storage blocks that enhance a level of sequentiality is higher than the weighting identified with unused storage blocks that are not yet associated with physical storage space within the backend storage system, wherein the selection of unused storage blocks identified with higher weightings is prioritized over unused storage blocks identified with lower weightings.

16. The computing system of claim 15 wherein prioritizing the selection of unused storage blocks identified within the backend storage system includes:

selecting all unused physically sequential storage blocks identified within the free-backed storage pool prior to selecting any unused storage blocks identified within the free-unbacked storage pool.

17. The computing system of claim 15 wherein prioritizing the selection of unused storage blocks identified within the backend storage system includes:

weighting unused storage blocks based, at least in part, upon the level of sequentiality of the physical storage space within the backend storage system, wherein physical storage spaces that enhance sequentiality are prioritized over physical storage spaces that do not enhance sequentiality.

18. The computing system of claim 15 further configured to perform operations comprising:

writing data to the selected one or more unused storage blocks identified within the storage pools.

19. The computing system of claim 15 wherein the backend storage system is a thinly-provisioned backend storage system.

20. The computing system of claim 15 wherein the physical storage space within the backend storage system includes at least a portion of a storage slice.

21. The computing system of claim 15 wherein the backend storage system includes a data array.

* * * * *